US010069712B2

(12) United States Patent
Qian et al.

(10) Patent No.: US 10,069,712 B2
(45) Date of Patent: Sep. 4, 2018

(54) INTERFERENCE CANCELLATION USING NON-LINEAR FILTERING

(71) Applicants: ZTE Corporation, Shenzhen (CN); ZTE Canada Inc., Toronto (CA)

(72) Inventors: Xing Qian, Conestogo (CA); Yu Chen, Shenzhen (CN)

(73) Assignees: ZTE Corporation, Shenzhen (CN); ZTE Canada Inc., Toronto (CA)

(*) Notice: Subject to any disclaimer, the term of this patent is extended or adjusted under 35 U.S.C. 154(b) by 170 days.

(21) Appl. No.: 15/266,944

(22) Filed: Sep. 15, 2016

(65) Prior Publication Data
US 2017/0085401 A1 Mar. 23, 2017

(30) Foreign Application Priority Data

Sep. 17, 2015 (WO) ................ PCT/CN2015/089887

(51) Int. Cl.
H04L 25/03 (2006.01)
H04L 12/26 (2006.01)
H04L 5/00 (2006.01)
H04L 27/26 (2006.01)

(52) U.S. Cl.
CPC ............ H04L 43/16 (2013.01); H04L 5/00 (2013.01); H04L 27/2601 (2013.01)

(58) Field of Classification Search
CPC ............................ H04L 25/00; H04L 43/00
See application file for complete search history.

(56) References Cited

U.S. PATENT DOCUMENTS

2014/0153625 A1* 6/2014 Vojcic ..................... H04L 1/005
375/224
2015/0215700 A1* 7/2015 Sun .......................... H04R 3/002
381/94.2

* cited by examiner

Primary Examiner — Zhiren Qin
(74) Attorney, Agent, or Firm — Perkins Coie LLP

(57) ABSTRACT

To process received wireless signals received in a receiver, a noise and interference estimate is generated by subtracting the component from the received OFDM signal, a normalized noise signal by whitening the noise and interference estimate is produced, interference estimation information is computed from the normalized noise signal, a non-linear frequency domain filtering operation is performed on an output of the interference estimation to generate a frequency domain filtered signal, and a non-linear time domain filtering operation is performed on the frequency domain filtered signal to generate an estimate of an unwanted component of the received OFDM signal. The non-linear filtering may be performed using a median filter or an adaptive median filter or an adaptive hybrid median filter.

26 Claims, 5 Drawing Sheets

INTERFERENCE CANCELLATION USING NON-LINEAR FILTERING

CROSS REFERENCE TO RELATED APPLICATIONS

This patent document claims the benefit of priority under 35 U.S.C. § 119(a) and the Paris Convention of International Patent Application No. PCT/CN2015/089887, filed on Sep. 17, 2015. The entire content of the before-mentioned patent application is incorporated by reference as part of the disclosure of this patent document.

BACKGROUND

This patent document relates to digital signal processing used at a wireless signal receiver.

As the number of wireless user devices increases, do does the use of spectrum for wireless transmissions. Often, signals from multiple communication networks are receivable at locations, especially densely populated areas and public places. Many traditional data reception techniques are not adequately able to handle situations where interferences from other neighboring devices and networks may degrade the quality of a desired signal being received.

SUMMARY

This patent document describes technologies, among other things, for processing received wireless signals using non-linear filters in time domain and frequency domain, to mitigate undesirable loss of performance of interference cancellation operation due to the presence of impulse noise.

In one aspect, a robust parameter regression algorithm for use in a wireless communication system with multi-inter-cell interferences at cell-edge, especially for the blind interference information extraction of advanced network assisted interference cancellation suppression (NAICS) receiver, e.g., as specified in LTE-Advanced Release 12 is disclosed.

In another example aspect, an adaptive median hybrid filter is disclosed, which can be used in wireless communication applications, e.g., detailed blind parameter estimation for NAICS advanced receiver, and possible also for other performance enhancement techniques in wireless networks under strong multi-inter-cell interference.

In another example aspect, techniques are disclosed for processing received wireless signals in a receiver in which an OFDM signal is received, a noise and interference estimate is generated by subtracting the component from the received OFDM signal, a normalized noise signal by whitening the noise and interference estimate is produced, interference estimation information is computed from the normalized noise signal, a non-linear frequency domain filtering operation is performed on an output of the interference estimation detection to generate a frequency domain filtered signal, and a non-linear time domain filtering operation is performed on the frequency domain filtered signal to generate an estimate of an unwanted component of the received OFDM signal.

Details of the above aspects and their implementations are set forth in the accompanying drawings, the description and the claims.

DETAILED DESCRIPTION

Figure 1:
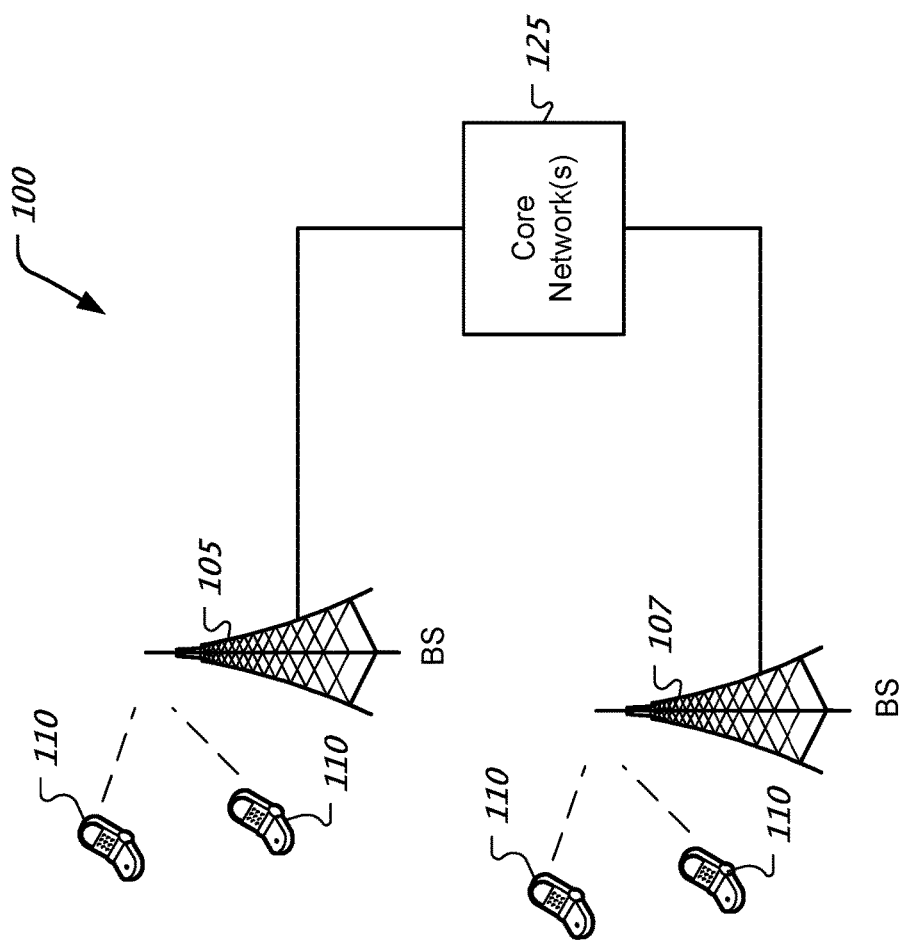
FIG. 1 shows an example of a wireless communication system.

A robust parameter estimation technique is proposed in this invention for Network Assisted Interference Cancellation/Suppression (NAICS) application. Under wireless radio channel with multi-inter-cell interferences, extracted information from received samples on each Reference Element (RE) is unlikely with normalization distribution. Algorithm based on normal distribution should be very cautious to get reliable estimation during post-processing regression. Robust regression algorithm with outlier detection and rejection capability is a powerful technique to deal with heavy-tail noise. Linear filter can smooth out sharp edges from extracted information that may indicate the ONSET/OFFSET of strong interference. Non-linear filters such as Median Filters (MF) are able to preserve discontinuities of interference edges while simultaneously reducing noise and handle non-Gaussian noise as outliers. However MF suffers from some shortcomings that can be alleviating by designing Median Hybrid Filters (MHF) that combine the noise removal ability of linear filter with the edge preserving and outlier removing ability of MF. In this invention, Adaptive Median Hybrid Filters (AMHF) is proposed to use in wireless communication applications, especially blind parameter regression for NAICS receiver. With the proposed algorithm, residual interferences and noise could be suppressed effectively. Discontinuities of dominant interference edge at time-frequency domain could be preserved sharply. Key parameters of AMHF such as window size and outlier detection threshold could be adapted depending on median deviation. The disclosed algorithm is also able to tracking the interference dynamic changes with time that might reduce the implementation complexity and/or increase parameter detection performance.

Wireless data service requirements have been tremendously growing in recent years due to new generation of wireless gadgets, e.g., smartphone tablet and also due to evolution of use of wireless devices from being voice and data-centric to multimedia-centric. This continuing tendency uses increasing network capacity in many dimensions, e.g., efficiency, spectrum and density. The radio spectrum is a scare resource, and it is advantageous as spectrally efficient as possible. In order to achieve this goal, frequency reuse technique to improve capacity and spectral efficiency has been used in some deployments. For example, long term evolution (LTE-Advanced) system uses frequency-reuse equal to one meaning that whole available frequency band reuse by every Evolved Node B (eNodeB) in the network. In practice, using the same frequency band in neighboring cells often causes high levels of inter-cell interference, especially at cell edges. Interference from unwanted signals is an ever-present issue in wireless communications. LTE deployments typically employ universal frequency reuse without soft handoff. Consequently, high levels of interference, low Signal-to-Interference-plus-Noise Ratio (SINR) and poor receiver performance can be expected near the cell-edge. Understanding and mitigating interference is critical to the performance of wireless networks.

During continuous enhancements in the radio link performance, advanced Radio Resource Management (RRM) methods and interference mitigation techniques are used to combat inter-cell interference. Interference avoidance techniques based on RRM can be used to limit the effect of interference within the network and improve the attainable system capacity. In addition to various Inter-Cell Interference Coordination (ICIC) schemes compatible with LTE-Advanced Release 10, interference rejection and cancellation algorithms can also be used to mitigate inter-cell interference. In Release 11, specifying User Equipment (UE) performance requirement in Interference Rejecting Combining (IRC) was the first attempt towards increasing the role of the receiver in the advanced receiver design. LTE Release 11 specified UE performance requirements for Cell-Specific Reference Signals (CRS), and focused on how CRS mitigate interference for heterogeneous deployments where co-channel interference from CRS dominates but is negligible from physical downlink shared channel (PDSCH). In LTE Release 12, performance enhancements to intra-cell and inter-cell interference mitigation at receiver are demonstrated by exploring the degree of interference knowledge with possible assistance from the network. Network assistance which enables the use of a more advanced receiver including non-linear structure has achieved promising performance gains compared to Release 11—IRC under link-level simulation.

In contrast to the philosophy of interference suppression where the interference is directly suppressed and treated as background noise, in NAICS, interference estimation and cancellation is performed in two successive steps: estimating the exact interfering signal and then subtracting the estimated interference from received signal. With full knowledge of interference, link-level simulation showed that advanced downlink receiver with interference cancellation gives the significant performance improvements. This is helpful in obtaining an accurate estimate of the interfering signal including the knowledge of its transmission structure (modulation scheme, transmission mode and transmission power) and channel information before subtraction. Generally, there are two separate procedures for dealing with interference: interference extraction and interference reconstruction for received signals.

Different interference cancellation receivers based on different assumptions on the interference signal knowledge and respectively may need different network-assisted information. Generally, the required parameters for advanced receiver such as Symbol Level Interference Cancellation (SLIC) include the number of antenna ports, channel estimation, modulation schemes, transmission mode, PDSCH transmission power related to reference symbols, etc. However, most of those parameters may be blindly detected without or with a little bit network assistance. Blind estimation is focusing on the correlation between the assumed data sent and received without knowing the information of the exact transmitted data. It may use specified algorithms and more received samples to perform statistical analysis, and regression.

Interference information should to be fully and blindly detected prior to applying the interference cancellation algorithm without any network assistances. Due to the fact that regression algorithm based on normal distribution assumption should be conservative to get a reliable estimation, there are several obvious limitations which make the standard LS method ill-suited to estimate parameters at cell-edge. It is inevitable to use robust regression. Using some embodiments disclosed in the present document, residual interferences and noise could be suppressed effectively. Discontinuities of dominant interference edge at temporal-frequency domain could be preserved sharply. Key parameters of filter such as MF window size and outlier detection threshold could be adapted depending on median deviation to represent the dynamic correlation caused by fading channel and interference existence. Reserved the edge of interference and adaptive interference detection thresholds improve the detection reliability of interference presence or not under multi-cell-interference environment for LTE-Advanced systems at cell edges. In addition, tracking the dynamic changes of interference with time might reduce the implementation complexity and/or increase parameter detection performance.

In some embodiments, parameters may be estimated prior to applying an interference cancellation algorithm. Reliable estimation is of central important role in achieving promising performance. For example, the reliability of the detection of indication of whether interference is present in PDSCH may have impact on the throughput performance. If a UE fails to detect interferers in a certain portion of the received signal spectrum, its throughput performance may be degraded because of lack of interference cancellation or suppression. Although some conventional algorithms make an assumption of normal distribution, it is rare that the extracted information from received samples on each RE in a wireless radio channel with multi-inter-cell interference actually has normal distribution. Through experimentation, the inventor found out that the algorithm based on normal distribution tend to be inaccurate in computing interference estimation during post-processing regression. For example, the Least Squares (LS) method, which minimizes the sum of squared residuals over all observed samples, is a standard approach in regression analysis to approximate solution of over-determined systems with the assumption that parameters follow statistical property of normal distribution. Other similar approaches include weighted-LS and Minimum Mean Squared Error (MMSE), and so on.

For a real-life deployment, e.g., a large-scale LTE network in an urban area, operational conditions such as the wireless channel in use, a number of interfering sources generated from the surrounding time synchronized and/or unsynchronized inter-cells, etc., change dynamically with time. Data transmissions in an interfering cell which result in dynamic ON/OFF statistical characteristic of interference in a current cell, highly depend on the dynamic scheduling behavior of the neighboring cell. The granularity, e.g., the time of occurrence and the duration, of an interference burst is typically unknown in advance. The signals received at a receiver may have a different scale once they are interfered with by signals of neighboring cells. Information extracted from received samples may be contaminated by spike-like noise with a heavy tailed distribution. Idealistic statistical model, often used in link-level simulation for algorithm design, may be ill-suit to estimate cell-edge performance in a real-life cellular network. The estimation precision cannot be improved by simply increasing the number of estimation samples used by convolutional linear regression algorithms. Often, conventional estimates based on Gaussian distributional assumption could be made grossly inaccurate by a small amount, or a fraction, of non-Gaussian residual interference or localized non-stationarity. The present document, in one aspect, discloses a robust regression algorithm with outlier detection and rejection capability, which is a powerful technique to successfully cope with such heavy-tail noise and produce accurate estimates of interference.

The robust algorithm described herein is fundamentally different from other commonly used adaptive or threshold based algorithms, which are based on statistical parameters and/or edge detection and seem less suitable for impulse noise smoothing. Impulse noise generally has a lower probability of occurrence and a considerably higher probability for large amplitude of interference or noise. A smooth signal region with impulse noise, and an edge with smaller amplitude, indicating a change in signal level, are difficult to distinguish front each other using some simple statistical parameters. An idealistic model, e.g., a model that assumes a smooth statistical distribution, is likely to underestimate the existence and impact of impulse noise. In addition, such implementations often use a linear filter that smoothes out sharp edges, e.g., sudden changes in received signal values, from extracted information that may indicate the ONSET/OFFSET of a strong interference. However, non-linear filters such as median filters (MPs) are able to preserve discontinuities of interference edges while simultaneously reducing noise and handling non-Gaussian noise as outliers. In some embodiments, a simple 1-D MF is sufficient to remove either positive or negative impulse noise of low density.

The use of MF as a simple and effective tool for removing spike-like noise and at the same time preserving edges is known in image processing applications. However, using a simple MF filter for noise removal in digital communications may not be suitable in many cases. For example, efficiency of Gaussian noise suppression for standard MF is typically worse than that of a mean filter having the same window size. Such a shortcoming of an MF can be alleviated by designing a finite impulse response (FIR) or infinite impulse response (IIR) Median Hybrid Filter (MHF) that combines the noise removal ability of a linear filter with the edge preserving and outlier removing ability of MFs. In some disclosed embodiments, an Adaptive MHF (AMHF) that combines the advantages of a standard mean filter and MFs can be used for parameter estimation during signal reception operation. The AMHF is insensitive to specific threshold values, and its implementation is feasible and efficient. The performance of quantitative estimations in terms of Gaussian noise suppression efficiency, impulsive noise removal ability and edge preservation in the post-processing regression, could be further enhanced by using Hybrid filter. In addition, FIR/IIR filters require less computation than that of the standard MF.

In some OFDM based communication systems, such as LTE, within the duration of transmission of one OFDM symbol, each UE transmission is multiplexed by mapping user symbols onto OFDM REs according to a time-frequency resource allocation type. With the assumption of resource allocation Type-1 for NAICS operation, a given user is allocated a block of consecutive sub-bands. If the serving cell and the interfering cells are synchronized in time and frequency, sub-frames and slots from all cells are aligned with reasonable receiver assumption, and the interference level will be approximately constant for each sub-band of a given OFDM symbol. Nevertheless, interference experienced on adjacent sub-carriers will remain strongly correlated, and it is therefore reasonable to perform filtering of the interference estimates on whole OFDM symbol to enhance the estimation performance. If the interfering cells are not time-synchronized with the desired cell, this temporal correlation is no longer true.

For a nonlinear MF, it may be advantageous to adaptively adjust filter-window length before information characteristics can be changed. If the window is too small, spurious features will not be removed from the resulting information estimates. For dynamic channel and interference, it may not be possible to pre-define the optimum window size, and the window size may have to match time-frequency correlation bandwidth adaptively. The inventor's experimentation showed that an adaptive filter employing adaptive length algorithms based on the intersection of confidence interval rule, exhibits improved performance for impulse noise removal. This rule enables the algorithm to be adaptive in such a way that its quality is close to one if the smoothness of the estimated signal is known in advance.

In a cellular network that uses OFDM based transmissions, a transmitter usually remains on for a relatively long period of time, for example quite a few Transmission Time Intervals (TTIs) of OFDM. Both the interference power and the measurement error may fluctuate from one TTI to the next. Consequently, interference often has a strong temporal correlation, which enables use of a filter to remove random estimation errors in time domain. Such temporal correlation may not have a duration that is long enough for use of low-pass exponential smoothing filters, such as an IIR filter. During operations, temporal characteristics of an interference highly depend on the dynamic scheduling behavior in neighboring cells in reaction to the packet arrival process, which may be assumed to be a Poisson process. Exponential smoothing can perform reasonably well and poorly in predicting interference, however the robust median regression can achieve closely the best estimation by exponential filtering with the optimal parameters.

In statistics, an outlier may refer to a sample whose one characteristic (e.g., amplitude, power or phase) is too much different from other samples, thus arousing suspicion about its use in calculations. The identification of outliers can lead to the discovery of useful and meaningful knowledge and has a number of practical applications. In wireless cellular communications, outliers in values of samples taken at a receiver almost unavoidably arise in practical parameter estimation problems, at least due to the nature of multi-inter-cell interference. Some regression techniques are "robust" with respect to outliers. A robust technique implicitly may identify abnormal data, e.g., outliers, and may isolate outlier's influence on the output. In some cases, detecting whether or not an interference is present (e.g., ONSET/OFFSET edge) is mathematically equivalent to an outlier detection problem. In the statistical literature, the notion of a breakdown point is used to measure the degree of robustness. The median is a robust measure of central tendency, while the mean is not. The median has a breakdown point of 50%, while the mean has a breakdown point of 0%. In addition to heuristic methods, Least Trimmed Squares (LTS) and Least Median Squares (LMedS) regression are two of the original high breakdown regression estimators. LMedS calculates the median of the square of the error and seeks to minimize this, it can estimate parameters when the original samples have up to 50% of poorly corrupted samples. This indicates that interference ONSET/OFFSET boundary could be detected robustly with LMedS/LTS by using only very small number of samples.

FIG. 1 shows an example of a wireless communication network or system. This wireless communication network can include one or more base stations (BSs) 105, 107 and one or more wireless devices 110. A base station 105, 107 can transmit a signal on a forward link (FL), known as a downlink (DL) signal, to one or more wireless devices 110.

A wireless device 110 can transmit a signal on a reverse link (RL), known as an uplink (UL) signal, to one or more base stations 105, 107. A wireless communication system can include one or more core networks 125 to control one or more base stations 105, 107. One or more base stations form a radio access network. A base station, due to its nature of providing radio access for a wireless device, either alone or in combination with one or more other base stations, can be referred to as an access point (AP), an access network (AN) or eNodeB. Examples of wireless communication systems that can implement the present techniques and systems include, among others, wireless communication systems based on Code division Multiple Access (CDMA) such as CDMA2000 1x, High Rate Packet Data (HRPD), Long-Term Evolution (LTE), Universal Terrestrial Radio Access Network (UTRAN), and Worldwide Interoperability for Microwave Access (WiMAX).

Figure 2:
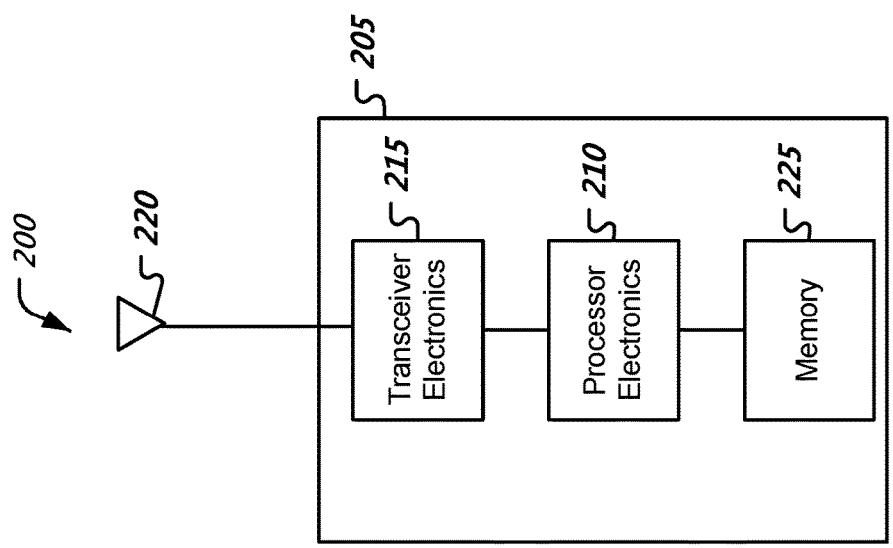
FIG. 2 shows an example of a wireless communication apparatus.

FIG. 2 shows an example of a radio transceiver station 200 for implementing a wireless device, a base station or other wireless communication modules. Various examples of radio stations include base stations and wireless devices in FIG. 2. A radio station 205 such as a base station or a wireless device can include processor electronics 210 such as a microprocessor that implements methods such as one or more of the techniques presented in this document. A radio station 205 can include transceiver electronics 215 to send and/or receive wireless signals over one or more communication interfaces such as one or more antennas 220. A radio station 205 can include other communication interfaces for transmitting and receiving data. In some implementations, a radio station 205 can include one or more wired communication interfaces to communicate with a wired network. A radio station 205 can include one or more memories 225 configured to store information such as data and/or instructions. In some implementations, processor electronics 210 can include at least a portion of transceiver electronics 215 and a memory 225.

In some implementations, radio stations 205 can communicate with each other based on a CDMA air interface. In some implementations, radio stations 205 can communicate with each other based on an orthogonal frequency-division multiplexing (OFDM) air interface which car, include Orthogonal Frequency-Division Multiple Access (OFDMA) air interface. In some implementations, radio stations 205 can communicate using one or more wireless technologies such as CDMA such as CDMA2000 1x, HRPD, WiMAX, LTE, and Universal Mobile Telecommunications System (UMTS).

The disclosed techniques can be implemented on the radio station 205 and in the system depicted in FIG. 2.

Example Applications

In LTE-Advanced Release-12 enhancements, an advanced receiver with neighboring interference cancellation algorithm is expected to be used in an LTE-Advance system at cell-edges to combat with strong multi-cell interferences and improve system capacity compared with Release 11 IRC. The performance gain is achieved by increasing the degree of interfering transmission knowledge from blind parameter estimation with possible network-assistance. In some embodiments disclosed in this document, a robust regression algorithm that is based on AMHF is used on blind parameter estimation used for advanced NAICS receiver. The main parameters calculated prior to applying the interference cancellation depend on the detailed interference cancellation algorithm, but most algorithms use information of interfering transmission including the modulation scheme, transmission power ratio of the traffic to pilot symbols, transmission mode and the detection of whether interference is present or not.

Precise and reliable parameter estimation is useful in achieving interference cancellation. At cell-edge with multi-cell interference, there are several obvious limitations which make the conventional regression, such as LS and linear filter, ill-suited to estimate interfering parameters. Interfering samples used for parameter estimation from wireless radio channel under multi-cell interference are unlikely to have a normal distribution, and are likely contaminated by unpredictable, large scale spike-like noise beyond ideal interference model in link-level system simulations. A regression algorithm based on normal distribution may not be able to yet a reliable estimation. For real-life deployed large-scale LTE networks, channel condition, number of interfering sources generated from the surrounding time synchronized and/or unsynchronized cells change dynamically with time. Data transmission of interfering cells with dynamic ON/OFF statistical characteristic highly depends on the dynamic scheduling behavior in neighboring cells. In addition, interference has strong temporal-frequency correlation, which enables the use of filter to remove random measurement errors. Adaptive robust regression algorithms with noise suppression, outlier rejection, interfering edge preserving and adaptive regression window and detection threshold can be very helpful for application under such environments.

In some embodiments, algorithms based on median family, including MF, LMedS, AMHF, could be used according to different aspects of signal processing algorithms at cell-edge with multi-inter-cell interferences. Especially, AMHF, which combines the advantage of a standard, non-linear median and a linear mean filter, is a preferable choice to combat signal with heavy-tail noise distribution. The present document discloses the illustration of the adaptive robust algorithm to interference information extraction, e.g., blind parameters, such as the traffic to pilot power ratio and the detection of interference presence, during post-processing regression.

In the present document, for simplicity of explanation, the neighbor interference model specified in 3GPP TR 36.388 is used, but the disclosed techniques can also be practiced in other situations.

Let the number of simultaneously transmitting cells be N, including the serving cell. The received signal at a receiver is given by the superposition of signals received from all N cells, including the serving cell, $$y_k = \sum_{i=1}^{N} \sqrt{\beta_i}\, H_{ik} x_{ik} + n_k \qquad \text{Eq. (1)}$$

In Eq. 1, $\beta_i$ represents the traffic to pilot power ratio of the signal is transmitted from $i^{th}$ cell, $H_{ik}$ is the channel matrix of the $i^{th}$ cell on $k^{th}$ RE, $x_{ik}$ is the modulated symbol transmitted by the $i^{th}$ cell on the $k^{th}$ subcarrier and assumed to have a unit power in average. In addition, k=0, 1, 2, ..., K−1, where K is the total number of observed subcarrier. Of the N cells, one is the serving cell and N−1 interferes, and without loss of generality, it is assumed that Cell 1 and 2 are the serving cell and dominant interfering cell respectively.

UE attempts primarily to cancel the data transmission on Cell 2. Signal processing algorithm attempts to extract transmission information structure of Cell 2 robustly.

For the simplicity of explanation, the following additional assumptions are made, which are consistent with network deployment scenarios assumption in 3GPP TR38.388 for NAICS operation.

With respect to cellular transmissions, it is assumed that the nature and strength of interference can vary greatly from one TTI to another. It is also assumed that some interfering signals can be stronger than typical serving cell signals. For a UE at a cell-edge, every cell may be an interferer and none is significantly better than others. Network model in link-level simulation only contains a few cells might not contributes sufficient out-of-cell interference.

With respect to signal timing, a synchronous network deployment is assumed for the NAICS receiver. It is also assumed that transmission subframes and slots are aligned. Receiver performance degradation from timing and frequency synchronization error, as well as under asynchronous deployment is ignored. It is also assumed that a per-subcarrier interference channel estimation is performed.

With respect to network operation, resource allocation Type-1 is assumed, e.g., during the period of each OFDM symbol, a given user is allocated a frequency sub-band, a block of consecutive subcarriers with the assumption of operation for NAICS. Interference experienced on adjacent sub-carriers will remain strongly correlated. The knowledge of interference presence is used by NAICS receivers at each PRB.

Furthermore, interferers are explicitly modelled based on dynamic ON/OFF pattern according to the ON/OFF modelling. Interference characteristics depend on the dynamic scheduling behaviour in neighbouring cells in reaction to the packet arrival process. Packet arrival is assumed to be a Poisson process with a packet arrival rate. The packet duration is a function of packet arrival rate, average packet size and modulation used for transmission, e.g., modulation and coding scheme (MCS) used in LTE. It is also assumed that interference has a constant MCS/RI across the time and frequency domain for the duration of each packet. Samples have different scale once they are interfered by signal of neighbouring cell. Thus the interference graph relevant is the bipartite graph formed by joining edges from any ONSET and OFFSET transmission.

Assuming that only the desired signal and one single dominate interferer is taken into account explicitly at the receiver, the received signal could be rewritten as $$y_k = \sqrt{\beta_1} H_{1k} x_{1k} + \sqrt{\beta_2} H_{2k} x_{2k} + \sum_{i=3}^{N} \sqrt{\beta_i} H_{ik} x_{ik} + n_k. \quad \text{Eq. (2)}$$

Without loss of generality, assuming that severing cell signals is stronger than the interfering cell signal, an interference rejection combining scheme, such as the linear minimum mean square error interference rejection combining (E-LMMSE-IRC) specified by LTE, is applied to suppress interference signal and estimate the desired serving cell signal. With the assumption of estimate channel estimation, $\hat{H}_{1k}$, $\hat{H}_{2k}$, traffic-to-pilot power ratio $\hat{\beta}_1$, $\hat{\beta}_2$, and modulated symbol $\hat{x}_{1k}$, $\hat{x}_{2k}$ per sub-carrier for serving cell and dominate interfering cell, respectively. The pre-processing of received symbol could be used for dominate interfere information extraction after post cancellation for desired signal, $$\tilde{y}_k = \sqrt{\beta_2} H_{2k} x_{2k} + z_k \quad \text{Eq. (3)}$$

$$z_k = \sqrt{\beta_1} H_{1k} x_{1k} - \sqrt{\hat{\beta}_1} \hat{H}_{1k} \hat{x}_{1k} + \sum_{i=3}^{N} \sqrt{\beta_i} H_{ik} x_{ik} + n_k \quad \text{Eq. (4)}$$

For simplicity, only one layer may be transmitted for both target UE and interfering UE. The reliable channel estimation for both desired and interfering signals is available perfectly from reference symbols by channel estimation. The residual desired signal and all the oilier signals are treated as colored Gaussian and then whitened along with the background noise for interfering signal information detection. The granularity of detection is one PRB pair within each sub-frame.

The interfering signal is the signal to be blindly detected. Several conventional detection algorithms could be applied to determine the dominant interferer. For example, in some embodiments, an algorithm used is to calculate the difference between the received pre-processed signal and a closest constellation point multiplied by channel estimate and the traffic to pilot power ratio of the signal. The jointly estimated mapped symbol and the traffic to pilot power ratio of the signal $\hat{\beta}_2$ are the constellation point $\hat{x}_{2k}$ that minimums, by taking hard decisions, as shown in Eq. 5.

$$\min_{\hat{x}_{2k}, \hat{\beta}_2} \left\| \tilde{y}_k - \sqrt{\hat{\beta}_2} \hat{H}_{2k} \hat{x}_{2k} \right\|^2 \quad \text{Eq. (5)}$$

Because of the possible strong non-Gaussian residual interference, Gaussian noise is negligible at most situations at cell-edge. An IRC receiver utilizing the knowledge on the covariance matrix of the total interference plus noise, and pre-whitening the received signals to suppress colored noise, may not be sufficient to improve cell-edge performance at low SINR. In this case, the performance loss due to residual interference may still be considerable. This means that if the receiver has a perfect estimate of the channel, the information of dominant interference estimation could not be optimum. In fact, the estimate of the interference will always have a power that is lower or equal to the actual interference power.

The techniques described in the present document are amenable to working together with any algorithms for interfering information extraction. It is assumed that the extracted information per RE are contaminated with noise and often contain outliers because of measurement, modelling error and interference characteristics. Interference is highly unpredictable, with highly-tail distribution and depends on various factors such as wireless channel, traffic from other UE and noise, number of interfering cells, etc. Robust post-processing is required to get accurate interfering information for NAICS application by exploiting temporal-frequency correlation.

In some embodiments, a non-linear AMHF can be used in post-processing regression for interference extraction. In some embodiments, the measures interference power $I_k = \|\tilde{y}_k\|^2$ and/or $\hat{\beta}_2$ estimation can be to operate the AMHF. Some examples of filters used and the corresponding relevance to regression is as follows.

Examples of Median Filters

The usefulness of MF is based on two properties: edge preservation and noise reduction with robustness against impulsive-type noise containing gross outliers. Neither property can be achieved by traditional linear filter easily. An MF replaces the input sequences within a window of a certain length with the median value of the sequence within that window. The output $I_k^{Med}$ for the sample at k can be written as:

$$I_k^{Med} = MED[I_{k-L}, \ldots, I_{k-1}, I_k, I_{k+1}, \ldots, I_{k+L}], \quad \text{Eq. (6)}$$

where 2L+1 is the filter window size. The filter thus uses both side values to predicting the current point. However, it only uses rank order information of the input data and discards its original temporal order information. For a stationary signal corrupted by noise, it can perform poorly for noise reduction.

Examples of Adaptive Median Filters

The window size of a median filter, e.g., as shown in Eq. 6, can be adaptively changed to get minimum median absolute deviation. Varying data-driven window size methods can be used for dynamic signal where underlying signal statistics changes with time.

Examples of FIR/IIR-Median Hybrid Filters

This type of filter combines the desirable properties of the FIR/IIR filer for noise removal and capability of MFs to preserve edges. The operation of this filter can be written as:

$$I_k^{Med} = MED[\Phi_1(I_k(K)), \Phi_2(I_k(K)), \ldots, \Phi_M(I_k(K))], \quad \text{Eq. (7)}$$

where $\Phi_i$ is the $i^{th}$ FIR/IIR sub/filter operation on the input sequences. The length K and the number of sub-filters M can be selected to allow for an acceptable compromise between noise reduction and edge preservation. This filter can react much faster to changing input statistics, compared to than conventional MFs of the same length.

Examples of Adaptive Median Hybrid Filters

In some embodiments, adaptive sub-fillers are used to estimates the current signals from the previous signals. The output of the overall filters is the median of the adaptive filter outputs and the current signals. The inventor's experiments have shown that the AMHF is useful to track and preserve rapid changes in signal characteristics well and is especially useful for filtering of highly nonstationary signal.

Examples of Least Median Regression and Least Trim Regression

One aim of regression is to estimate unknown parameter from input data. In a typical least-squares (LS) solution, the estimated parameter values, $\beta$, are defined to be those values that minimize an object function, $S(\beta)$, of squared residuals $S = \sum_{i=1}^{n} r_i(\beta)^2$, where the residuals are defined as the differences between the values of the dependent values and the model values $r_i(\beta) = y_i - f(x_i, \beta)$, where n is the overall number of samples. Then the LMedS is given by:

$$\min_{\beta} \text{median } r_i(\beta)^2 \quad \text{Eq. (8)}$$

The estimator yields the smallest value for the median of squared residuals computed from the entire data in the window. The LMedS efficiency is poor in the presence of Gaussian noise. The LTS method attempts to minimize the sum of squared residuals over a subset, k, of those n points. The n-k points which are ignored do not influence the regression. For the LTS1 regression, let $r_{(j)}(\beta)$ denote the ordered absolute values of the residuals in an ascending order of absolute values, the object function to be minimized is:

$$S_k = \sum_{j=0}^{k} (r_{(j)}(\beta))^2. \quad \text{Eq. (9)}$$

Figure 3:
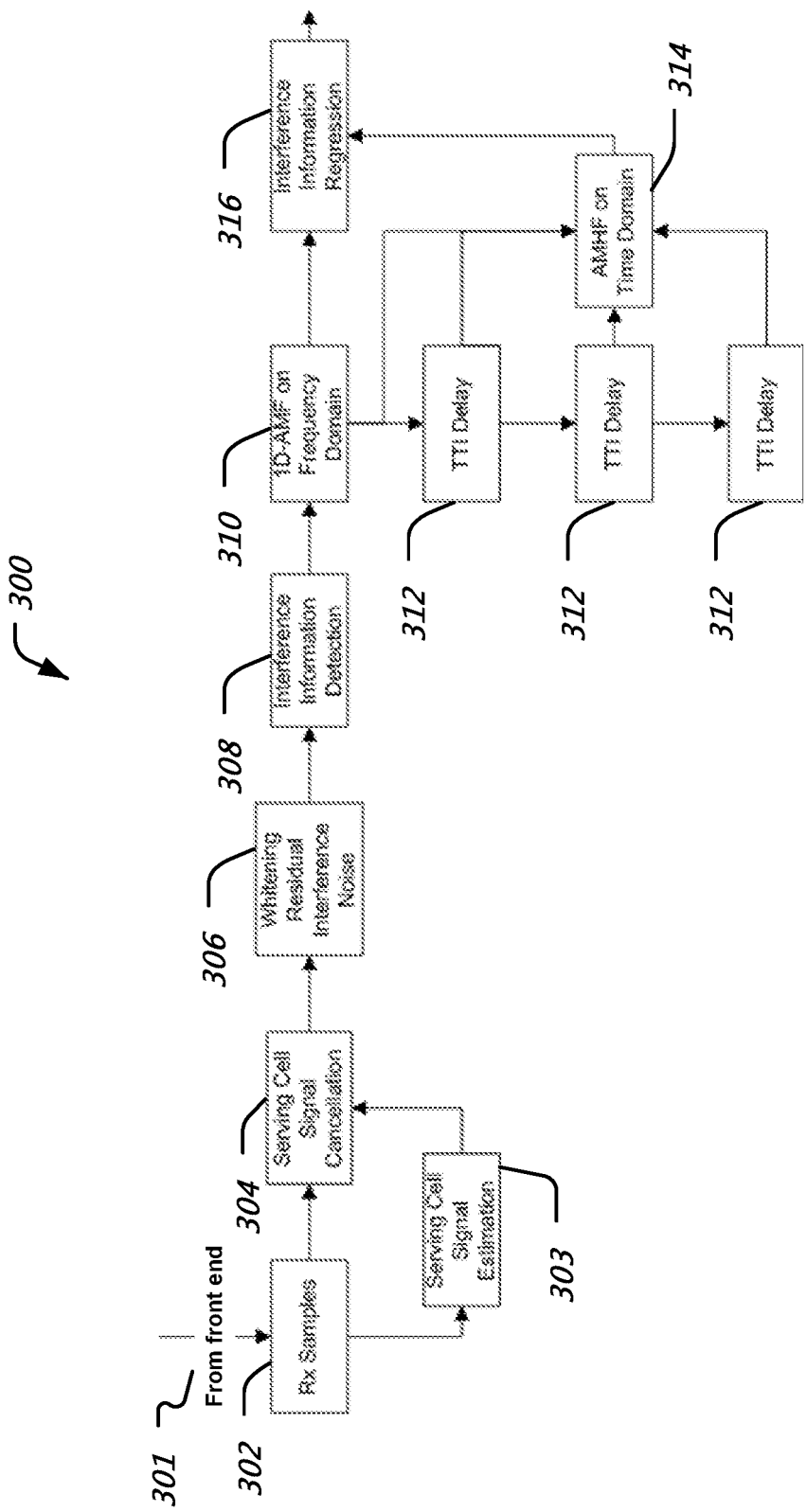
FIG. 3 is a block diagram showing an example of a wireless receiver apparatus.

FIG. 3 shows an example block diagram of a portion of a wireless signal receiver apparatus 300, in which some of the non-linear filtering schemes disclosed in this document can be used for processing received wireless signals. The receiver apparatus 300 may be embodied in the wireless receivers 110 or the receiver 200 as described herein. In the apparatus 300, received signals on one or more antenna may be processed by a front end, e.g., a radio frequency receiving stage including a low noise amplifier and an analog to digital conversion process to generate a stream of samples 301 from the front end received by a module 302. The received samples may correspond to each RE, and may include contribution from signals of the serving cell and all interfering cell signals. The serving cell signal is estimated by a module 303 using a signal estimation algorithm, e.g., with E-MMSE-IRC, using the availability of channel estimation for serving and interfering cells. The module 304 then cancels the serving-cell signal from the received samples, outputting residual samples whose main contribution may be from a dominant interfering cell signal. A whitening module 306 may perform the function of whitening the residual interference and noise signal.

At block 308, the interfering information per subcarrier is blindly detected from residual samples. The resulting output is post-processed, both in frequency domain (block 310), and in time domain (314). Using a one-dimensional adaptive media film (310), enhanced results are obtained from sample median of MF. The results are filters in time domain using an adaptive median hybrid filter (314) by using TTI-delayed version of the signal (blocks 312). During the process, both the residuals and a scale estimate are computed. Outliers are detected and eliminated due to the non-linear filtering. The results of time domain filtering (314) and the frequency domain filtering (310) are processed by an interference information regression module 316 to obtain the information. While FIG. 3 shows a single pass, in other embodiments, an iterative solution, between serving and interfering signal estimation and cancellation could also be applied, and convergence is achievable, typically after 3-5 iterations.

Example Embodiments of an Adaptive Median Filter in Frequency Domain for Each OFDM Symbol It is straightforward to use 1-D AMF in frequency domain for each OFDM system directly for both with/without interference cases as means of suppressing the residual interference from other cells. With Type-1 resource allocation for NAICS, the interference level for each sub-band will be approximately constant, and the interference on adjacent sub-carriers remains strongly correlated, and it is appropriate to perform filtering of the interference estimates per sub-bands. So difference edge could be detected, even edge stages if with multi-cell interference using different bandwidth and different resource allocation type. Signal interference, coming from other unsynchronized cell without NAICS limitation, might use of distributed resource allocation (e.g., LTE resource allocation Type-2), and the interference could be different on each RB. Adaptive median filtering could be implemented numerically, using a processor, or may be hard coded into electronic circuitry, which may be re-programmable for filter coefficient values and window size. The adaptation control may similarly be performed numerically or using hardware circuitry.

Example Embodiments of an Adaptive Median Hybrid Filter in Time Domain for Each OFDM Symbol By default, per-TTI and per-PRB granularity is assumed for multi-cell interference, the interference is fluctuated from one TTI to another. Exploiting larger parameter variation granularity may reduce the algorithm implementation complexity while keeping same degree of detection performance. User traffic is mapped onto OFDM units using a different pattern for each cell. If adjacent cells are not running at full load, at times certain sub-carriers will be free of interference. The rapid fluctuation of inter-cell interference depends heavily on traffic load. OFDMA averages interference at the block level preserving its busty and non-Gaussian nature at the symbol level. Whether the interferer is present all or only part of the time, at equivalent power levels, non-Gaussian interference leads to alternative statistical approach than Gaussian interference. To diminish the influence of fast fluctuation of interference, MHF can be used to detect interfering in lime domain robustly.

However, the efficiency of Gaussian noise suppression for standard MF is often worse than for usually mean filter having same window size with and without interference using different filters. For this reason, Median Hybrid Filters (MHF) may be used in interference estimation. The linear filter can reduce noise but corrupt edge; the median filter can reduce noise as well as preserve the detail. The MHF has evidently effect on Gaussian noise suppression and residual interference removal ability. Due to the median computation, this kind of nonlinear-fillers adapt and preserve abrupt changes in signal statistics substantially better than conventional adaptive filters, well suitable for detection of short duration interference. For simplicity, an FIR-Median Hybrid Filters (FMHF) could be used. The input signal is filtered with M linear phase FIR filter, and output of FMHF is the median of the outputs of filters. An FMHF, may alleviate the data sorting problem since median is taken over the outputs of the FIR substructures and the number of the substructures is much smaller than the number of the data samples inside the filter window. The properties and number of the sub-filters depend on the application. Sub-filters are usually of moving average type, but other more complex filter with better performance is preferably. For simple case, M=3, corresponds the different level of interference in LTE-system, e.g., without interference, only one and two interferes, respectively, is adequate to tracking interference changing with the time.

In addition, adaptive linear receiver is widely used for LTE system detection. An AHMF is suitable for filtering signals with rapidly varying and short duration characteristics, adaptive filter substructures are used to estimate the current signal value from previous input or output signal values. The output of the overall filter is the median of the adaptive filter outputs and the input signal value. The filtering could be implemented numerically, using a processor, or may be hard coded into electronic circuitry, which may be re-programmable for filter coefficient values and window size.

Example Embodiments of Outlier Detection for Interference ONSET/OFFSET Detection An outlier is a value which deviates so much from local other values as arouse suspicious that was generated by a different statistical distributional assumptions. Computation of interference presence or not detection (ON/OFF edge) in time domain is equivalent to an outlier detection problem, e.g., interference discontinuous jumps could be automatically detected by using outlier detection algorithm. In this way, dominant interference could be tracked dynamically. We use distance-based approach for outlier detection. Outlier detection threshold is related to the median absolute deviation. In LMedS, the threshold related to robust standard deviation.

$$\sigma = 1.4826\left[1 + \frac{s}{n-p}\right]\sqrt{M_j} \quad \text{Eq. (10)}$$

where $M_j$ is the minimal median. p is available samples and n samples used for median estimation. The constant 1.4836 is a coefficient to achieve the same efficiency as a LS in the presence of only Gaussian-only noise. The parameter $5/(n-p)$ is to compensate the effect of a small set of data. So the detection threshold is adaptive with estimated median, instead of predefined value. Distance-based outlier detection based on local neighborhood scale better with simpler computation than other method, well suit for current application.

Example Embodiments of LMedS and LTS for Precise Parameter Regression

For processing in a receiver, the received samples have different scale once they interfered by signal of neighboring cell. The interference could be very short duration, and spike-like noise with very high amplitude. For parameter regression, such as Pa estimation, channel estimation, a few data point, e.g., outliers have disproportionate effects on the slope of the regression equation in lineal regression analysis. It is advantageous to have samples that have no outliers. For channel estimation, embodiments of receiver processing may perform outlier detection and replace of detected outliers with an expected value of the signal. For distance-based outlier detection, without prior knowledge, nonparametric methods are known as a better solution than the statistical methods. Least Square method (LSM), including MMSE, require data in Gaussian or near Gaussian distribution, which cannot be always guaranteed. If the correct model can be identified, model-based approaches like the Kalman filter are suitable for removing and replacing outliers. However, in many case, to identify the correct model is not feasible. Good results cannot always be obtained simply by only increasing the number of regression samples used in the calculations. Regression techniques that are "robust" with respect to outliers could get good results with few samples. Both LMedS and Least LTS are robust statistical methods that fit a function to a set of data whilst not being unduly affected by the presence of outliers. The method was capable of locating outliers from a data set containing very high of outliers, such as 50% outliers. It is advantageous to perform outlier detection and replacement before to use LSM and MMSE algorithm.

In some embodiments, the above-discussed processing may lie performed using AMHF for UE signal processing under strong multi-inter-cell interference at cell edge in LTE-Advanced network. Some advantageous aspects of the discloses techniques include:

[1] MF for dominant interference detection is robust for suppression residual interference and non-Gaussian heavy-tailed noise at cell-edge with unknown multi-cell interference.

[2] Robust MF with adaptive window length provides a simple approach to compromise the performance between statistically reducing variance with long window at stationary channel and increasing variance due to dynamic channel under frequency selective lading.

[3] MHF provides an effective way to remove both Gaussian noise and outliers from contaminated in the dominant interference signal. Preserving the discontinuities of interference edges in both time and frequency domains increases the detection reliability of interference presence or not, one of the parameters required by advanced NAICS receiver.

[4] AHMF reduces the complexity of MF. Multiple sub-filters with adaptive filter coefficient, detection thresholds could be chosen adaptively. Adapting outlier detection threshold could significantly improve the detection reliability of interference presence or not. Further, linear regression with outlier free and replaced samples increases estimation reliably considerably.

[5] The identification of outliers can lead to the discovery of useful and meaningful knowledge about received signal. Information from detected outlier provides information of ONSET/OFFSET boundary. Tracking the interference in time domain can improve interference detection reliability.

Figure 4:
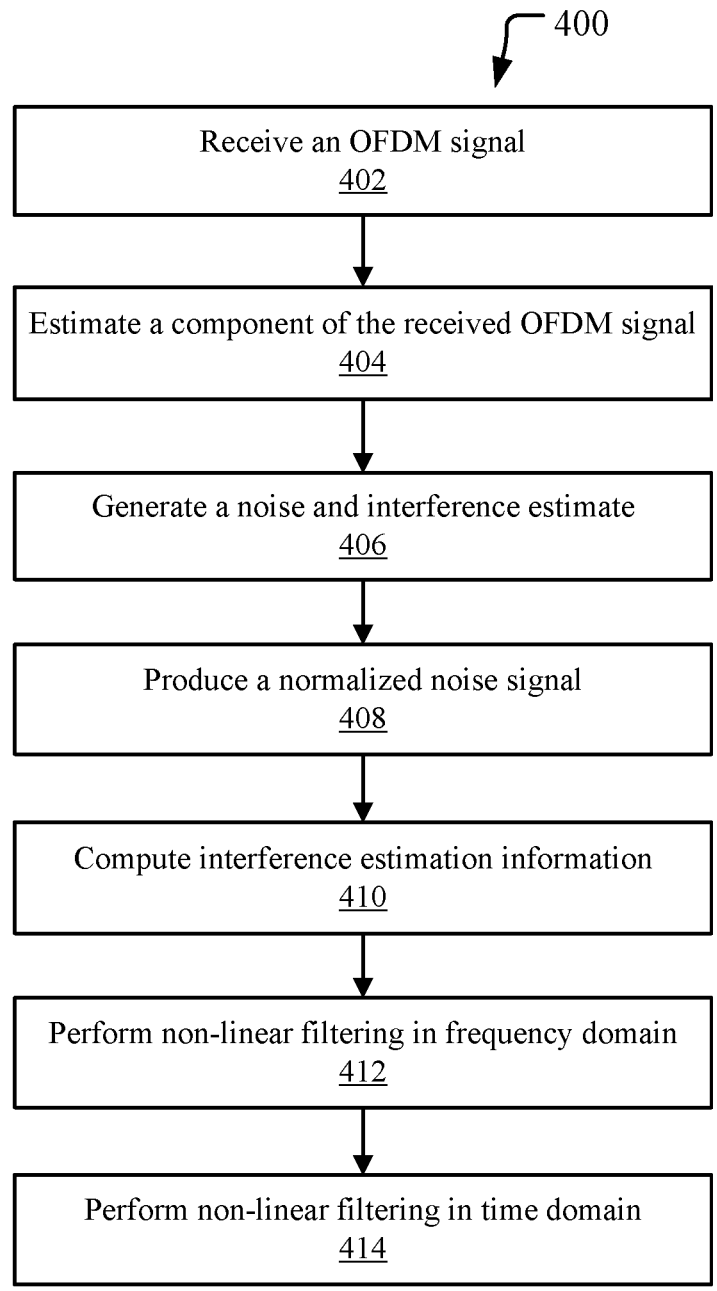
FIG. 4 shows a flowchart of an example method of wireless communications.

FIG. 4 shows an example flowchart of a method 400 of operating wireless communication receiver.

The method 400 include, at 402, receiving, by a wireless receiver, an orthogonal frequency division multiplexing (OFDM) signal. For example, LTE specifies signal transmissions using OFDM. The OFDM signal is characterized by a transmission time interval, and wherein the non-linear lime domain filtering is performed in the frequency domain filtered signal and a delayed version of the frequency domain filtered signal delayed by an integer number of transmission time interval values. The transmission time interval represents a logical lime period, within which resources are allocated for various transmissions. A non-linear filter may use a non-linear function of input samples to calculate output of the filter. In some embodiments, the method 400 may be implemented on a radio transceiver station 200.

The method 400 include, at 402, estimating, a component of the received OFDM signal corresponding to a serving cell transmission. As described in this document, an IRC algorithm may be used at 402, e.g., an IRC algorithm specified in LTE specifications.

The method 400 include, at 404, generating a noise and interference estimate by subtracting the component from the received OFDM signal. For example, as described with respect to module 304, the estimate may be generated by subtracting serving cell signal estimates from received sample values.

The method 400 include, at 406, producing a normalized noise signal by whitening the noise and interference estimate.

The method 400 include, at 408, detecting interference estimation information from the normalized noise signal.

The method 400 include, at 410, performing a non-linear frequency domain filtering on an output of the interference estimation to generate a frequency domain filtered signal. In some embodiments, the non-linear frequency domain filtering may be performed by filtering the output of the interference estimation using a non-linear filter.

The method 400 include, at 412, performing non-linear time domain filtering on the frequency domain filtered signal to generate an estimate of an unwanted component of the received OFDM signal. In some embodiments, to perform the non-linear time domain filtering, a median filter may be used.

Figure 5:
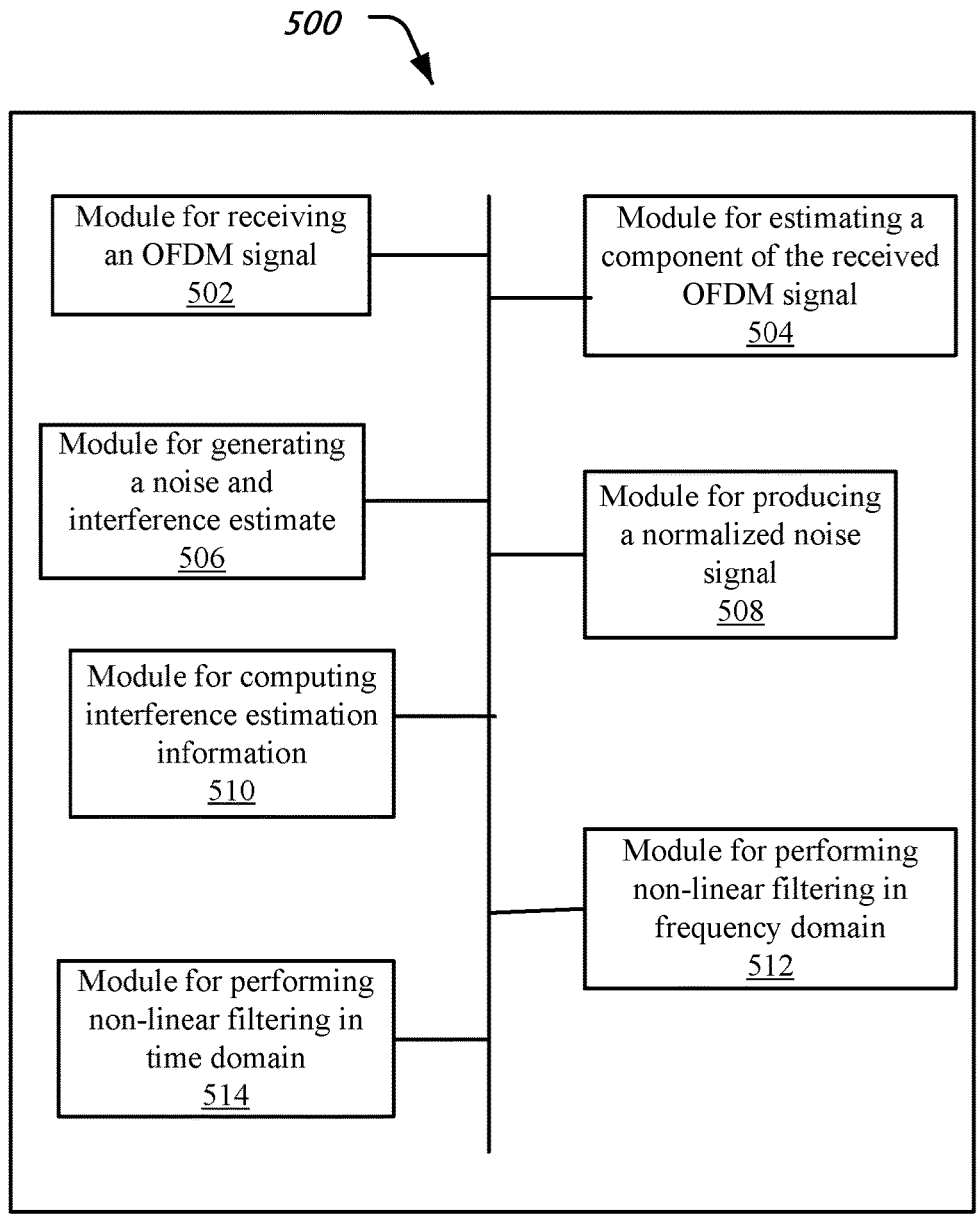
FIG. 5 shows a block diagram example of a wireless communication apparatus.

FIG. 5 shows an example block diagram of a portion of a wireless signal receiver apparatus 500. The apparatus 500 includes a module 502, for receiving, by a wireless receiver, an orthogonal frequency division multiplexing (OFDM) signal.

The apparatus 500 includes a module 504, generating a noise and interference estimate by subtracting the component from the received OFDM signal. For example, as described with respect to module 304, the estimate may be generated by subtracting serving cell signal estimates from received sample values.

The apparatus 500 includes a module 506, producing a normalized noise signal by whitening the noise and interference estimate.

The apparatus 500 includes a module 508, detecting interference estimation information from the normalized noise signal. In some embodiments, the interfering signal is blindly detected.

The apparatus 500 includes a module 510, performing a non-linear frequency domain filtering on an output of the interference estimation to generate a frequency domain filtered signal. In some embodiments, the non-linear frequency domain filtering may be performed by filtering the output of the interference estimation using a non-linear filter.

The apparatus 500 includes a module 512, performing non-linear time domain filtering on the frequency domain filtered signal to generate an estimate of an unwanted component of the received OFDM signal. In some embodiments, to perform the non-linear time domain filtering, a median filter may be used.

In some embodiments, a wireless receiver apparatus may include receiver circuit that receives an orthogonal frequency division multiplexing (OFDM) signal. The apparatus may also include a processor that processes the received signals by estimating, a component of the received OFDM signal corresponding to a serving cell transmission, generating a noise and interference estimate by subtracting the component from the received OFDM signal, producing a normalized noise signal by whitening the noise and interference estimate, detecting interference estimation information from the normalized noise signal, performing a non-linear frequency-domain filtering on an output of the interference estimation to generate a frequency domain filtered signal, and performing non-linear time domain filtering on the frequency domain filtered signal to generate an estimate of an unwanted component of the received OFDM signal.

It will be appreciated by one of ordinary skill in the art that techniques for processing received wireless signals using non-linear filters in lime domain and frequency domain, to mitigate undesirable loss of performance of interference cancellation operation due to the presence of impulse noise are disclosed.

It will further be appreciated that, in one aspect, a robust parameter regression algorithm for use in a wireless communication system with multi-inter-cell interferences at cell-edge, especially for the blind interference information extraction of advanced network assisted interference cancellation suppression (NAICS) receiver, e.g., as specified in LTE-Advanced Release 12 is disclosed.

The disclosed and other embodiments and the functional operations and modules described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program docs not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is what is described and illustrated, including:

1. A method of wireless signal processing performed at a receiver in a wireless cellular communication network, comprising:
   receiving, by a wireless receiver, an orthogonal frequency division multiplexing (OFDM) signal;
   estimating, a component of the received OFDM signal corresponding to a serving cell transmission;
   generating a noise and interference estimate by subtracting the component from the received OFDM signal;
   producing a normalized noise signal by whitening the noise and interference estimate;
   computing interference estimation information from the normalized noise signal;
   performing a non-linear frequency domain filtering on an output of the interference estimation to generate a frequency domain filtered signal; and
   performing non-linear time domain filtering on the frequency domain filtered signal to generate an estimate of an unwanted component of the received OFDM signal.

2. The method of claim 1, wherein the performing the non-linear frequency domain filtering comprises:
   filtering the output of the interference estimation using a non-linear filter.

3. The method of claim 1, wherein the OFDM signal is characterized by a transmission time interval, and wherein the non-linear time domain filtering is performed in the frequency domain filtered signal and a delayed version of the frequency domain filtered signal delayed by an integer number of transmission time interval values.

4. The method of claim 3, wherein the non-linear time domain filtering comprises an adaptive median filter.

5. The method of claim 4, further comprising:
measuring variations in the received signal; and
adapting a characteristic of the adaptive median filter based on the measured variations in the received signal.

6. The method of claim 5, wherein the characteristic of the adaptive median filter comprises a window of operation of the adaptive median filter.

7. The method of claim 5, wherein the measuring variations in the received signal includes:
updating, for each sample of the received signal, a median value of the received signal; and
comparing a difference between the sample and the median value with a predetermined threshold.

8. The method of claim 1, wherein the non-linear frequency domain filtering is performed using a median filter, the method further comprising:
estimating a statistical parameter of the received signal; and
changing a length of the median filter based on the statistical parameter.

9. The method of claim 8, wherein the estimating the statistical parameter comprises estimating an outlier signal value that varies from an expected signal value by more than a threshold.

10. A wireless receiver apparatus, comprising:
a receiver circuit that receives an orthogonal frequency division multiplexing (OFDM) signal; and
a processor that processes the received OFDM signals by:
estimating, a component of the received OFDM signal corresponding to a serving cell transmission;
generating a noise and interference estimate by subtracting the component from the received OFDM signal;
producing a normalized noise signal by whitening the noise and interference estimate;
detecting interference estimation information from the normalized noise signal;
performing a non-linear frequency domain filtering on an output of the interference estimation to generate a frequency domain filtered signal; and
perforating non-linear time domain filtering on the frequency domain filtered signal to generate an estimate of an unwanted component of the received OFDM signal.

11. The apparatus of claim 10, wherein the processor performs the non-linear frequency domain filtering by:
filtering the output of the interference estimation using a non-linear filter.

12. The apparatus of claim 10 wherein the OFDM signal is characterized by a transmission time interval, and wherein the processor performs the non-linear time domain filtering on the frequency domain filtered signal and a delayed version of the frequency domain filtered signal delayed by an integer number of transmission time interval values.

13. The apparatus of claim 12, wherein the non-linear time domain filtering comprises an adaptive median filter.

14. The apparatus of claim 13, wherein the processor further:
measures variations in the received signal; and
adapts a characteristic of the adaptive median filter based on the measured variations in the received signal.

15. The apparatus of claim 14, wherein the characteristic of the adaptive median filter comprises a window of operation of the adaptive median filter.

16. The apparatus of claim 14, wherein the processor measures variations in die received signal by:
updating, for each sample of the received signal, a median value of the received signal; and
comparing a difference between the sample and the median value with a predetermined threshold.

17. The apparatus of claim 10, wherein the processor performs the non-linear frequency domain filtering by:
implementing a median filter;
estimating a statistical parameter of the received signal; and
changing a length of the median filter based on the statistical parameter.

18. A non-transitory computer-readable program medium storing computer-executable instructions, which when executed by a processor, causing the processor to implement a method of wireless signal processing that comprises:
receiving, by a wireless receiver, an orthogonal frequency division multiplexing (OFDM) signal;
estimating, a component of the received OFDM signal corresponding to a serving cell transmission;
generating a noise and interference estimate by subtracting the component from the received OFDM signal;
producing a normalized noise signal by whitening the noise and interference estimate;
computing interference estimation information from the normalized noise signal;
performing a non-linear frequency domain filtering on an output of the interference estimation to generate a frequency domain filtered signal; and
performing non-linear time domain filtering on the frequency domain filtered signal to generate an estimate of an unwanted component of the received OFDM signal.

19. The non-transitory computer-readable program medium of claim 18, wherein the performing the non-linear frequency domain filtering comprises:
filtering the output of the interference estimation using a non-linear filter.

20. The non-transitory computer-readable program medium of claim 18 wherein the OFDM signal is characterized by a transmission time interval, and wherein the non-linear time domain filtering is performed in the frequency domain filtered signal and a delayed version of the frequency domain filtered signal delayed by an integer number of transmission time interval values.

21. The non-transitory computer-readable program medium of claim 20, wherein the non-linear time domain filtering comprises an adaptive median filter.

22. The non-transitory computer-readable program medium of claim 18, wherein the method further comprises:
measuring variations in the received signal; and
adapting a characteristic of the adaptive median filter based on the measured variations in the received signal.

23. The non-transitory computer-readable program medium of claim 22, wherein the characteristic of the adaptive median filter comprises a window of operation of the adaptive median filter.

24. The non-transitory computer-readable program medium of claim 22, wherein the measuring variations in the received signal includes:
updating, for each sample of the received signal, a median value of the received signal; and
comparing a difference between the sample and the median value with a predetermined threshold.

25. The non-transitory computer-readable program medium of claim 18, wherein the non-linear frequency domain filtering is performed using a median filter and the method further comprises:

estimating a statistical parameter of the received signal; and changing a length of the median filter based on the statistical parameter.

26. The non-transitory computer-readable program medium of claim 25, wherein the estimating the statistical parameter comprises estimating an outlier signal value that varies from an expected signal value by more than a threshold.

\* \* \* \* \*